Figure 5:
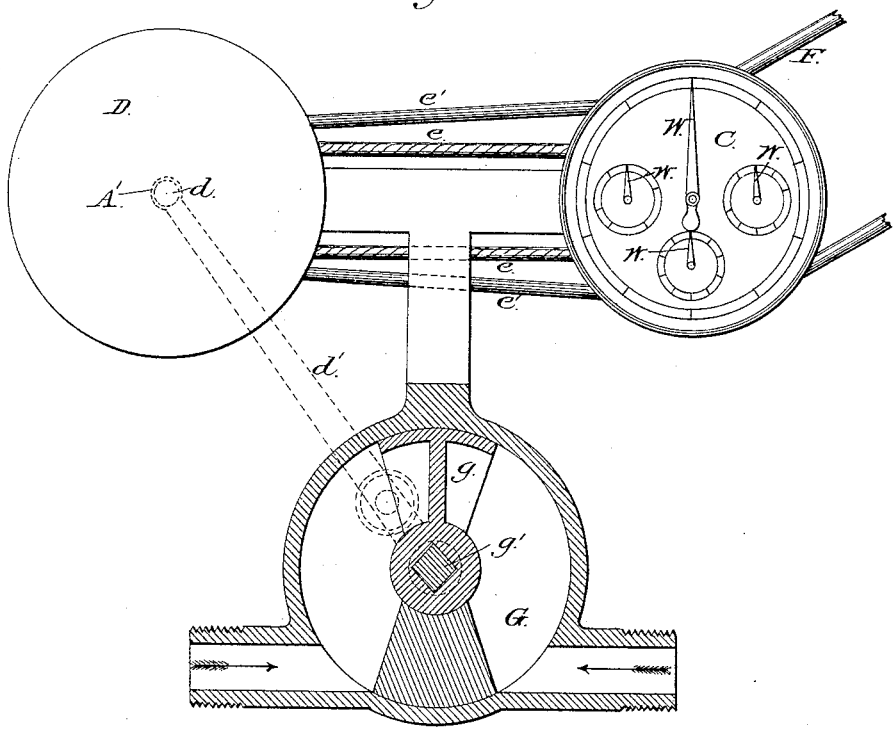

(No Model.) 3 Sheets—Sheet 1.
A. G. MEEZE.
APPARATUS FOR MEASURING AND CONTINUOUSLY REGISTERING PHYSICAL POWER.
No. 336,336. Patented Feb. 16, 1886.
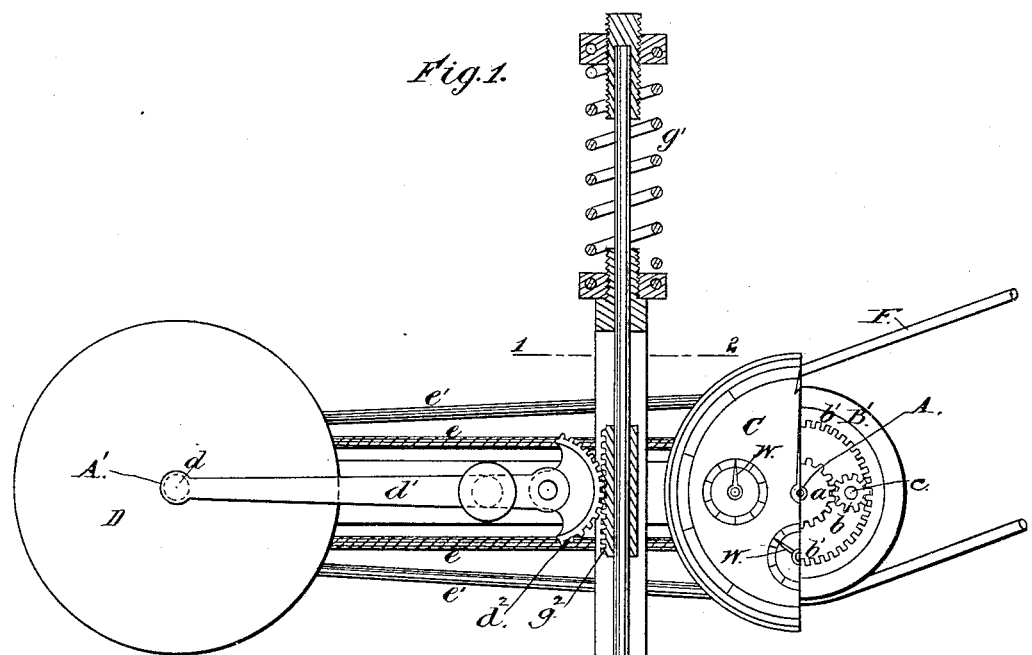
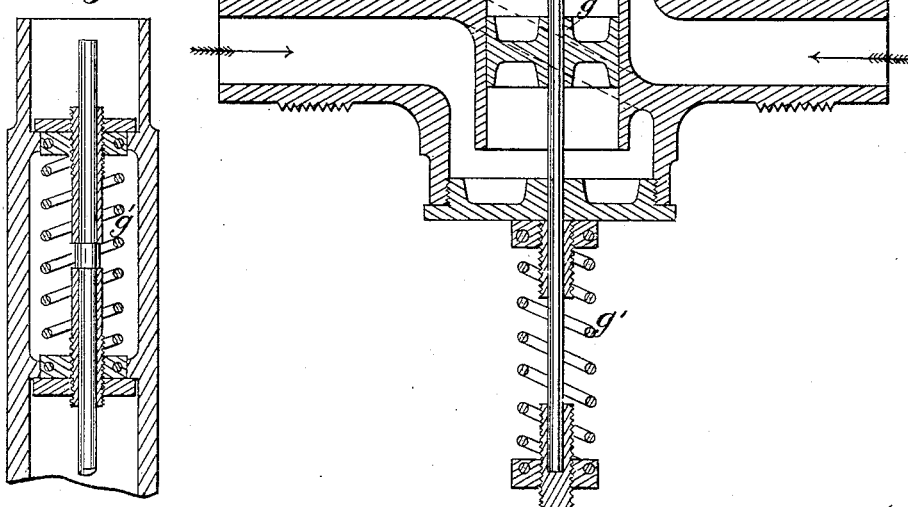
Witnesses:
John A. Ellis.
A. B. Moore.
Inventor:
Arthur George Meeze
By David A. Burr
Atty.

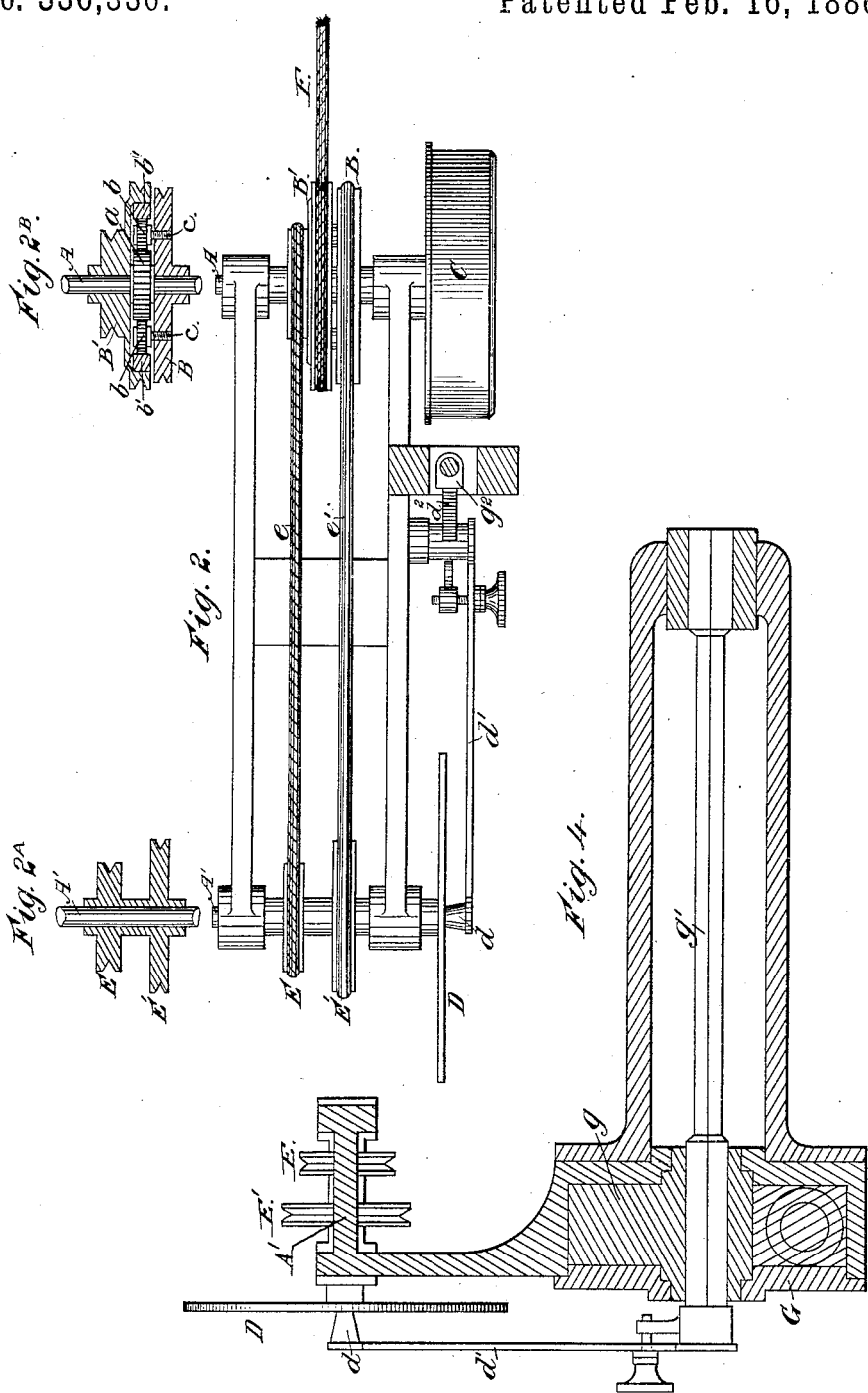

(No Model.) 3 Sheets—Sheet 3.
A. G. MEEZE.
APPARATUS FOR MEASURING AND CONTINUOUSLY REGISTERING PHYSICAL POWER.

No. 336,336. Patented Feb. 16, 1886.

UNITED STATES PATENT OFFICE.

ARTHUR GEORGE MEEZE, OF REDHILL, COUNTY OF SURREY, ENGLAND.

APPARATUS FOR MEASURING AND CONTINUOUSLY REGISTERING PHYSICAL POWER.

SPECIFICATION forming part of Letters Patent No. 336,336, dated February 16, 1886.

Application filed July 30, 1885. Serial No. 173,114. (No model.) Patented in England December 29, 1883, No. 5,909; in France, June 27, 1884, No. 162,999, and in Belgium April 5, 1885, No. 68,407.

*To all whom it may concern:*

Be it known that I, ARTHUR G. MEEZE, of Redhill, in the county of Surrey, England, have invented a new and useful Improvement in Apparatus for Measuring and Continuously Registering Physical Power; and I do hereby declare that the following is a full and exact description thereof, reference being had to the accompanying drawings, and to the letters of reference marked thereon, making a part of this specification, the same having been made the subject of Letters Patent in England, No. 5,909, of December 29, 1883; France, No. 162,999, of June 27, 1884, and Belgium, No. 68,407, of April 5, 1885.

My invention relates to improved apparatus for measuring and registering physical power, whereby I achieve results of great utility and economic value—such, for example, as the measurement or meterage of the power given out by steam, gas, water, hot-air, or other engines worked by fluid-pressure, the power transmitted through revolving shafting or communicated by driving-belts from one revolving shaft to another, the quantity of electrical energy passed through an electrical conductor, the power exerted by winds or other fluids in motion, and thence indirectly the quantity of such fluid passed through pipes or other conduits.

In the accompanying drawings, Figure 1 is a sectional elevation of my integrating mechanism adapted to measure and register the work done by a steam-engine, the effective pressure at every part of the stroke being ascertained by means of an auxiliary steam cylinder and piston; Fig. 2, a plan on the line 1 2 of Fig. 1. Figs. $2^A$ and $2^B$ are detail views thereof. Fig. 3 is a single-spring arrangement, which may replace the pair of springs shown in Fig. 1 as limiting the motion of the auxiliary piston. Figs. 4 and 5 also illustrate in sectional side and front elevations a modification of my integrating mechanism as adapted to measure and register the work done by a steam-engine in which the variations in steam-pressure are ascertained by its tendency to twist a rod.

The construction and arrangement of my apparatus (which I herein designate as a "dynamical integrator," and by which I effect mechanically the integration of two functions and register the product continuously upon a dial) is as follows: I mount a main shaft or spindle, A, so as to turn freely in suitable bearings. One part of this spindle I gear by a cog-wheel or other suitable means with a counter, C, composed of a train of decimal-wheels, and a dial-plate whereon the number of revolutions or parts of a revolution of the said spindle may be registered by means of index-hands W, carried by the wheels in the customary manner. Upon another part of this spindle A, I key or otherwise securely fasten a small cog-wheel, $a$, (see Figs. 1 and 2,) and upon the same spindle, and on opposite sides of this cog-wheel I mount pulleys B B', (see Figs. 2 and $2^B$,) which are arranged to turn freely upon said spindle. The face of the pulley B that is turned toward the cog-wheel $a$ carries one or more (by preference, two) projecting arms, $c\ c$, which serve as stud-axles for secondary cog-wheels or pinions $b\ b$, (see Fig. $2^B$,) turning freely thereon, and at the same time running in gear with the cog-wheel $a$ upon the main spindle A. The pulley B' carries a cogged rim secured thereto or formed integrally therewith, which is large enough in diameter to inclose the cog-wheels $a$ and $b\ b$, and which is furnished with internal or hypo-cycloidal teeth $b'$, cut to gear with the small or secondary cog-wheels $b\ b$, mounted on the stud-axles $c\ c$. The whole is thus arranged in gear to form an epicyclic train, from which it will be obvious that if the first-described pulley, B, be driven while the second pulley, B', is kept fixed, the main axle will be caused to rotate in the same direction, though not with the same velocity, as the moving pulley; and it is also evident that if the first pulley, B, be fixed and the second pulley, B', be driven, the motion of the main spindle A will be retrograde. If, therefore, both pulleys be driven in the same direction with a certain determinate difference of velocity, depending upon the relative diameters of the cog-wheels forming the epicyclic train, the main axle A will remain at rest. Any variation in this fixed ratio due to retardation or increase in the velocity of either pulley will, however, cause the main spindle to rotate, and the amount of this rotation will be registered upon the dial-plate of the counter C.

On another part of this same machine I mount in suitable bearings a second axle or spindle, A', the end of which terminates in a flat circular disk, D, or its equivalent—e. g., a cone. Against the face of this disk or its equivalent I cause to be pressed a movable friction-piece, d, actuated and controlled in a manner to be described hereinafter. Upon this secondary axle A', I mount two pulleys, E E', (see Figs. 2 and 2ᴀ,) suitably grooved, and, when necessary, roughened or lined with wood, india-rubber, or other suitable material, for the purpose of insuring the proper grip of the bands or belts by which they are driven. These pulleys E E' are securely fixed, so as to turn as one with the secondary axle A', and are placed in mechanical communication with the pulleys B B' upon the main axle by means of a pair of driving-belts, e e', which run in said grooves and in similar grooves cut in the pulleys that are mounted upon the main axle A. One of these driving-belts e I make of any suitable elastic extensile material. By preference I use a belt made of metallic wire wound in a long spiral spring and united at the ends by suitable connections, so as to form a continuous elastic driving-belt. The other, e', may be either a similar elastic extensile belt to the last, or an ordinary inelastic belt, of leather, gutta-percha, or other suitable material, or may be entirely replaced by equivalent gearing. In general I make the pulleys B B' and E E', above described, of such relative dimensions that when one of the pulleys —say B'—upon the main axle A, is caused to rotate it will communicate motion to the secondary axle A' through the elastic extensile driving-belt e, and thence by the other belt, e', to the other of the two pulleys—say B upon the main axle—in such wise that the difference in velocity between the two pulleys of the main axle, acting through the epicyclic gear described above, serves to keep the said main axle at rest.

When I employ the above-described integrating mechanism for the measurement of engine-power, I cause one of the two pulleys on the main shaft, and preferably the pulley B', which carries the cog-wheel with the internal gear, b', to be driven by a belt or other gearing, F, (see Fig. 1,) from some moving part of the engine, by which means I insure that the velocity of this pulley is always proportional to the velocity of the working parts of the engine. This pulley B' communicates its motion to the secondary shaft A', by means of the elastic extensile belt e, and thence, by the means provided, to the second pulley, B, on the main axle. The secondary shaft A' carries, as before described, at one extremity a flat-faced disk, or its equivalent, D, against which is pressed a movable friction-piece, d. The pressure of the friction-piece is capable of adjustment by means of a flexible arm or spring, d', and, normally, the friction-piece is kept pressed against the disk at its center, or at the apex of the cone, when the the latter is used instead of the disk, but is arranged so as to be free to move uniformly over its surface away from the center. For the measurement of engine-power this friction-piece is suitably connected with some kind of flexible or movable diaphragm or its equivalent, the displacement of which from the normal position is always proportional to the difference of pressures upon the opposite sides of the engine-piston, and I accomplish this result in various ways. In one form I employ a miniature steam-cylinder, G, (see Fig. 1,) both ends of which may be placed in communication with the ends of the engine-cylinder, while the motion of its piston $g$ is restricted by one or more spiral springs, $g'$, (see Figs. 1 and 3,) as in the ordinary steam-engine indicator. The displacement of the piston $g$ is thus proportional at every instant to the effective steam-pressure in the engine, and the motion of this piston I communicate either directly or through multiplying link-work to the friction-piece d, and thus cause the latter to be displaced from the center of the disk D by an amount always proportional to the effective pressure. A simple means for this purpose consists of a rack, $g^2$, on the rod of the miniature steam-piston, gearing into a sector-rack, $d^2$, on the end or hub of the pivoted spring-arm $d'$, as represented in Fig. 1. In this arrangement it will be seen the path of the friction-piece is not strictly radial; but by suitably adjusting the length of the pivoted spring-arm $d'$ and the size of the friction-piece the resulting error may, in accordance with well-known mathematical principles, be reduced to any assignable minimum.

It will be understood that the single-spring arrangement shown in Fig. 3 may be used to replace the double-spring arrangement of Fig. 1 for adjusting the position of the piston $g$.

In Figs. 4 and 5 I have shown equivalent devices for obtaining an indication of the steam-pressure as a factor in integrating the power exerted by an engine. In this case the friction-piece d is actuated by the pressure of the steam on a vibrating piston, $g$, which effects the torsion or twisting of a rod, $g'$, which rod, it is evident, might be replaced by a spring or springs. I have marked these parts $g$ and $g'$, respectively, as they are the precise mechanical equivalents of the piston and spring above described, and shown in Figs. 1 and 2.

As indicated by the arrows in Fig. 5, the cylindrical vessel G is connected with both ends of the main cylinder of the engine, and its piston $g$ is alternately subjected on opposite sides to a pressure of steam varying with the variations of steam-pressure before and behind the main driving-piston.

An arrangement for controlling the motion of the friction-piece somewhat analogous to the device adopted in the ordinary aneroid barometer for indicating pressures may also be used. For the same purpose, also, I may use a somewhat flattened bent tube, as in the ordinary fluid-pressure gage.

The action of my improved integrating device when thus used as an engine-power meter is as follows: The driving-pulley B' on the main axle A of the integrator is caused to rotate, as described above, at a velocity always proportional to that of a suitable moving part of the engine to which it is geared. The secondary shaft A' of the integrator and its attached disk D, being connected with the main axle through the elastic extensile driving-belt $e$, will then also be caused to rotate. The velocity of the secondary shaft and its friction-disk D will depend, however, not only on the relative sizes of the driving and the driven pulley, but in consquence of the driving-belt $e$ being elastic and extensile, it will also depend upon the work which the secondary shaft is required to do, for it is well known that when power is transmitted from one revolving shaft to another by means of elastic extensile belting the difference of velocity between the tight and slack parts of the belt is proportional to the power transmitted from the one shaft to the other, and that consequently the difference of velocity between the driving and the driven shaft is a function of the work done by the one shaft upon the other. Thus if in the normal position of the friction-piece $d$ the diameters of the pulleys B B' and E E' are such that the main axle A of the integrator is at rest, the ratio of the velocity of the driving-pulley B' on the main axle A to that of the pulley E on the secondary axle A' will be a certain determinate amount. If, now, the friction-piece $d$ be moved over the surface of the disk D away from its center, the velocity of the shaft A' carrying the disk will be diminished by an amount proportional to the extra work done, which obviously increases with the distance of the friction-piece $d$ from the center of the disk D. The absolute retardation of the secondary axle A', as shown on the dial-plate of the counter C, will thus depend upon two variables—first, the velocity of the piston, and, second, the effective pressure thereon, and will therefore be at once a measure and register of their product, $i.\ e.$—of the work done by the engine.

I claim as my invention—

1. The dynamical integrating device hereinabove described, comprising a main spindle, A, a counting device, C, an epicyclic train, $a\ b\ b'$, pulleys B B', geared to each other and to the main spindle by said epicyclic train, a secondary spindle, A', from which the power for the functions to be integrated is derived, and elastic extensile belts $e\ e'$, connecting the spindle A with the pulleys B and B', respectively, all substantially in the manner and for the purpose herein set forth.

2. A main-spindle, A, a counter, C, geared thereto, an epicyclic train, $a\ b\ b'$, pulleys B B', geared to each other and to the spindle A by said epicyclic train, a secondary spindle, A', elastic extensile belts $e\ e'$, connecting, respectively, the pulleys B' and B to said secondary spindle, a friction disk or cone, D, carried by the secondary spindle A', and a spring-actuated friction-piece, $d$, moving to and from the center of the disk or cone, so as to retard and control the velocity of the secondary spindle, all combined and operating substantially in the manner and for the purpose herein set forth.

3. The combination, with a main spindle, A, a counter, C, an epicyclic train, $a\ b\ b'$, pulleys B B', geared to each other and to the spindle by said epicyclic train, a secondary spindle, A', pulleys B' B, elastic extensile belts $e$ and $e'$, gearing said pulley to said spindle A', a friction-disk or cone, D, carried by the secondary spindle A', and a spring-actuated friction-piece, $d$, moving to and from the center of the disk or cone, of a steam-piston, $g$, working in a chamber made to communicate on each side of the piston with the two ends of the cylinder of the engine whose power is to be measured, a spring, $g'$, governing the piston, and an arm, $d'$, coupling the piston with the friction-piece, all substantially in the manner and for the purpose herein set forth.

In testimony whereof I have signed my name to this specification in the presence of two subscribing witnesses.

ARTHUR GEORGE MEEZE.

Witnesses:
ARTHUR W. MCLELLAN,
GEORGE P. SKELSEY,
*Both of No. 50 Gresham House, London, Notary's Clerks.*